(12) United States Patent
Ide et al.

(10) Patent No.: US 6,271,901 B1
(45) Date of Patent: Aug. 7, 2001

(54) LIQUID CRYSTAL DISPLAY DEVICE WITH TWO REFLECTIVE POLARIZERS PROVIDING METALLIC APPEARANCE EFFECTS

(75) Inventors: Masafumi Ide, Tokorozawa; Takashi Akiyama; Kanetaka Sekiguchi, both of Sayama; Masami Kikuchi, Kodaira; Yuichi Akiba, Tokorozawa; Koji Nakagawa, Hachioji; Takashi Toida, Tokyo, all of (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/254,642
(22) PCT Filed: Jul. 14, 1998
(86) PCT No.: PCT/JP98/03150
§ 371 Date: Mar. 11, 1999
§ 102(e) Date: Mar. 11, 1999
(87) PCT Pub. No.: WO99/04313
PCT Pub. Date: Jan. 28, 1999

(30) Foreign Application Priority Data

Jul. 14, 1997 (JP) .................................... 9-188208

(51) Int. Cl.$^7$ ............................................... G02F 1/1335
(52) U.S. Cl. .......................... 349/96; 349/98; 349/61; 349/106; 349/64
(58) Field of Search .................. 349/96, 98, 99, 349/61, 106, 64

(56) References Cited

U.S. PATENT DOCUMENTS

| | | | |
|---|---|---|---|
| 5,333,072 | * 7/1994 | Willett | 359/41 |
| 5,684,551 | * 11/1997 | Nakamura et al. | 349/69 |
| 5,686,979 | * 11/1997 | Weber et al. | 349/96 |
| 5,691,788 | * 11/1997 | Kim | 349/96 |
| 5,729,313 | * 3/1998 | Mitsui | 349/106 |
| 5,751,388 | * 5/1998 | Larson | 349/96 |
| 5,783,120 | * 7/1998 | Ouderkirk et al. | 264/134 |
| 5,825,542 | * 10/1998 | Cobb, Jr. et al. | 359/487 |
| 5,841,494 | * 11/1998 | Hall | 349/98 |
| 5,953,089 | * 9/1999 | Hiji et al. | 349/112 |
| 5,986,731 | * 11/1999 | Iijima | 349/117 |
| 6,008,871 | * 12/1999 | Okumura | 349/61 |
| 6,124,905 | * 9/2000 | Iijima | 349/62 |
| 6,169,708 | * 1/2001 | Kaneko | 349/115 |

FOREIGN PATENT DOCUMENTS

| | | |
|---|---|---|
| 54-153066 | 12/1979 | (JP) . |
| WO 95 17691 | 6/1995 | (WO) . |
| WO 95/17691 | 6/1995 | (WO) . |
| WO 95/17692 | 6/1995 | (WO) . |
| WO 95/17699 | 6/1995 | (WO) . |
| WO 95/27919 | 10/1995 | (WO) . |
| WO 97/01788 | 1/1997 | (WO) . |
| WO 98/12595 | 3/1998 | (WO) . |

* cited by examiner

Primary Examiner—William L. Sikes
Assistant Examiner—Tarifur R. Chowdhury
(74) Attorney, Agent, or Firm—Armstrong, Westerman, Hattori, McLeland & Naughton, LLP

(57) ABSTRACT

The liquid crystal display device comprises a liquid crystal cell with liquid crystals sealed thereinbetween, sandwiched between two transparent substrates having an electrode on each of the inner surfaces thereof facing each other, a first reflective polarizing film disposed on the visible side of the liquid crystal cell, a second reflective polarizing film disposed on the side of the liquid crystal cell, opposite from the visible side, and a light absorption film disposed on the side of the second reflective polarizing film, opposite from the visible side. The first reflective polarizing film as well as the second reflective polarizing film is a polarizing sheet reflecting a light linearly polarized in the direction orthogonal to the transmission axis thereof. A light absorption film and/or a backlight may preferably be disposed under the second reflective polarizing film. Further, an absorption-type polarizing film or a light diffusion layer may preferably be disposed on the visible side of the first reflective polarizing film.

17 Claims, 5 Drawing Sheets

LIQUID CRYSTAL DISPLAY DEVICE WITH TWO REFLECTIVE POLARIZERS PROVIDING METALLIC APPEARANCE EFFECTS

TECHNICAL FIELD

The invention relates to a liquid crystal display device for use as a display panel in various electronic equipment such as a timepiece (watch and clock), portable information equipment, and so forth.

BACKGROUND TECHNOLOGY

A timepiece for indicating digital display of time information such as the hour, minute, and second, and calendar information such as the date, days of the week, the month, and the year, by use of a liquid crystal display panel, has been in widespread use for wrist watches and clocks, provided with a crystal oscillation circuit.

There has also been in use a combination watch wherein an analog display indicating time information by the hands of the watch is used in combination with digital display indicating time information and calendar information in numbers and letters.

Further, there has been proposed an analog watch for selectively displaying markers in various patterns, or for displaying simulated hands for an hour hand, a minute hand, and a second hand, by providing the dial thereof based on a liquid crystal display panel (refer to, for example, Japanese Patent Laid-open S 54-153066).

A reflective-type liquid crystal display device, small in size and consuming very little electric power, has been in widespread use as a display panel for displaying necessary information (character information and graphic information) in various electronic equipment other than a timepiece, such as cellular phones, desktop electronic computers, game players, and so forth.

As such a liquid crystal display device as described above, in a conventional liquid crystal display panel, a liquid crystal cell filled with liquid crystals is sandwiched between two transparent substrates having an electrode on respective inner surfaces thereof, facing each other, and an upper polarizing film and a lower polarizing film are disposed, respectively, on the external surface of the transparent substrates, on the opposite sides. If an electric field is applied to the liquid crystals by applying a voltage to a pair of electrodes on the transparent substrates holding the liquid crystal cell therebetween, the optical property of the liquid crystals is changed, thereby locally controlling transmission and absorption of light falling on the liquid crystal display panel such that a predetermined display is effected.

Either of the upper polarizing film or the lower polarizing film is a polarizing film absorbing the light linearly polarized in the direction orthogonal to the transmission axis thereof.

In the case of a watch using the conventional liquid crystal display panel described above, time information and calendar information are displayed in black against a white background in a normally white mode that is common.

However, by simply displaying time information and calendar information in black against the white background as described in the foregoing, neither variation in design nor interest can be offered, with a resulting tendency to lose soon popularity with consumers. Probably, as a result, consumption of digital watches has recently been on the decline, and neither combination watches nor analog watches with a liquid crystal display panel have since received market acceptance.

Similarly, with the conventional liquid crystal display panel used in electronic equipment other than a timepiece, various information expressed in characters and graphics is generally displayed in black against the white background, and although there are some wherein information can be displayed in white against the black background in an inverse mode, the conventional liquid crystal display panel has still been found lacking in design variation and aesthetic qualities.

In light of the present situation as described, the present invention has been developed, and an object of the invention is to provide a liquid crystal display device for use in various electronic equipment such as a timepiece (watch and clock), and so forth, capable of offering attractive variation in design and displaying information clearly so that a viewer can see the display with greater ease.

DISCLOSURE OF THE INVENTION

To this end, a liquid crystal display device according to the invention comprises a liquid crystal cell with liquid crystals sealed therein, sandwiched between two transparent substrates having an electrode on each of the inner surfaces thereof facing each other, a first reflective polarizing film disposed on the visible side of the liquid crystal cell, a second reflective polarizing film disposed on the side of the liquid crystal cell, opposite from the visible side thereof, and a light absorption film disposed on the side of the second reflective polarizing film, opposite from the liquid crystal cell, and is characterized in that the first reflective polarizing film as well as the second reflective polarizing film is a polarizing sheet reflecting the light linearly polarized in the direction orthogonal to the transmission axis thereof.

Further, a backlight may be substituted for the light absorption film. In such a case, a translucent absorbing film is preferably installed between the backlight and the second reflective polarizing film.

Otherwise, first reflective polarizing film of the liquid crystal display device according to the invention may be disposed on the visible side of the liquid crystal cell, the second reflective polarizing film on the side of the liquid crystal cell, opposite from the visible side thereof, and an absorption-type polarizing film on the visible side of the first reflective polarizing film, such that the absorption-type polarizing film is a polarizing sheet absorbing the light linearly polarized in the direction orthogonal to the transmission axis thereof, and the transmission axis of the absorption-type polarizing film is oriented substantially in the direction of the transmission axis of the first reflective polarizing film.

In this case, the absorption-type polarizing film is preferably a color polarizing film mainly absorbing a light component at a specific wavelength, out of the light linearly polarized in the direction orthogonal to the transmission axis thereof.

Further, a light diffusion layer (light diffusion film) may be installed in place of the absorption-type polarizing film.

In the liquid crystal display devices described in the foregoing, a light absorption film or a backlight may preferably be disposed on the side of the second reflective polarizing film, opposite from the liquid crystal cell.

In the case where the backlight is installed, a translucent absorbing film is preferably installed between the backlight and the second reflective polarizing film.

It is desirable that in the liquid crystal display devices described above, the first reflective polarizing film and the second reflective polarizing film be disposed such that the transmission axes thereof cross each other at right angles or run parallel with each other.

Further, liquid crystals causing linearly polarized light passing therethrough to undergo phase modulation or intensity modulation are sealed in the liquid crystal cell. The liquid crystals causing phase modulation to occur are twisted nematic liquid crystals or supertwisted nematic liquid crystals, while the liquid crystals causing intensity modulation to occur are guest host liquid crystals.

It is desirable that the first reflective polarizing film is disposed such that the transmission axis thereof is oriented in the direction parallel with or orthogonal to the long axes of liquid crystal molecules located on the visible side of the liquid crystal cell.

With the liquid crystal display device according to the invention, constructed as above, half of the light falling thereon from the visible side thereof is reflected by the first reflective polarizing film, but the other half of light is transmitted therethrough, falling on the liquid crystal cell. The other half of the light is caused to undergo a change in optical property locally when transmitted through the liquid crystal cell, forming portions thereof where light is fully reflected by the second reflective polarizing film, and portions thereof where light is transmitted so that display in a metallic tone can be effected.

Depending on whether the transmission axes of the first and second polarizing films, disposed on opposite sides of the liquid crystal cell cross each other at right angles or run parallel with each other, on whether the transmission axis of the first polarizing film is oriented in the direction parallel with or orthogonal to the direction of the long axes of the liquid crystal molecules located on the visible side of the liquid crystal cell, or depending on types of liquid crystals in use and the method of applying a voltage, either of the background part or the display segment of the liquid crystal cell can be displayed in a metallic color through full reflection of incoming light while the other can be displayed in a dark color or an optional color of the light absorption film, or can be displayed in a transparent state (internal structure can be seen) or can be displayed by light emitted from the backlight.

Operation of a liquid crystal display panel is described hereinafter by way of example wherein the first and second reflective polarizing films, disposed above and below the liquid crystal cell, are arranged such that the transmission axes thereof run parallel with each other, and the liquid crystal cell with twisted nematic liquid crystals having a twist angle of 90 degrees sealed therein is used.

Half of the light falling on the liquid crystal cell from the visible side thereof (above) is reflected by the first reflective polarizing film. The other half of the light falls on the liquid crystal cell, and is transmitted therethrough. In the background part where no voltage is applied to the liquid crystals of the liquid crystal cell, transmitted light is rotated by 90 degrees, and turned into the light linearly polarized in the direction orthogonal to the transmission axis of the second reflective polarizing film, thereby being reflected substantially in full by the reflective polarizing film described. As a result, the background part is displayed in a metallic color (as against a mirror).

Meanwhile, in the display segment of the liquid crystal cell for displaying time information and calendar information, where a voltage is applied to the liquid crystals, light transmitted through the liquid crystal cell is not rotated, and is turned into the light linearly polarized in the direction parallel with the direction of the transmission axis of the second reflective polarizing film, thus being allowed to pass through the reflective polarizing film described to be absorbed by the light absorption film. Consequently, the display segment is displayed in a dark color. If a colored material is used for the light absorption film, however, light in a specific color only is reflected, and is transmitted along the optical path described, but in reverse order, falling on the visible side, and indicating display in the color of the light absorption film. In this case, however, since a half of incoming light is reflected by the polarizing sheet on the upper side, the entire surface of the liquid crystal display panel indicates display in a slightly metallic tone.

Further, it is also possible to display the background part in the color of the light absorption film and to display the display segment in a metallic color by inverting mode of display as described above.

Thus, with the liquid crystal display device according to the invention, variation in design can be brought about, effecting amusing display in marked contrast with the conventional liquid crystal display device wherein character information and graphic information are displayed in a black color against a white background.

Furthermore, with the liquid crystal display device according to the invention, by installing a backlight in place of the light absorption film, transmissive display can be effected at night or in dark locations.

If a translucent absorbing film is installed between the backlight and the polarizing sheet adjacent thereto, this will enable a viewer to see transmissive display using light from the backlight as well as reflective-type display using external light with greater ease.

Further, with the liquid crystal display device according to the invention, if an absorption-type polarizing film is disposed on the visible side of the first reflective polarizing film, which is disposed on the visible side of the liquid crystal cell, such that the transmission axis of the absorption-type polarizing film is oriented substantially in the same direction of the transmission axis of the first reflective polarizing film, the quantity of light, reflected from across the surface of the first reflective polarizing film and propagating toward the visible side, is reduced, moderating the metallic gloss (luster) across the surface of the display segment, enabling a viewer to see display with greater ease while improving the viewing angle characteristic of the liquid crystal display panel as well.

In this case, by use of a color polarizing film capable of mainly absorbing a light component at a specific wavelength, out of the light linearly polarized in the direction orthogonal to the transmission axis thereof as the absorption-type polarizing film, metallic gloss (luster) across the surface of the display segment can be moderated without sacrificing much brightness of display.

Otherwise, if a light diffusion layer (light diffusion film) is installed on the external side of the first reflective polarizing film in place of the absorption-type polarizing film, light reflected from across the surface of the first reflective polarizing film and light reflected from the information display segment by the second reflective polarizing film acting like a mirror are diffused, and metallic gloss can be moderated, effecting display in softer and whiter tones while improving the viewing angle characteristic of the liquid crystal display panel as well.

BEST MODE FOR CARRYING OUT THE INVENTION

Preferred embodiments of a liquid crystal display device according to the invention will be described in detail hereinafter with reference to the attached drawings.

Figure 1:
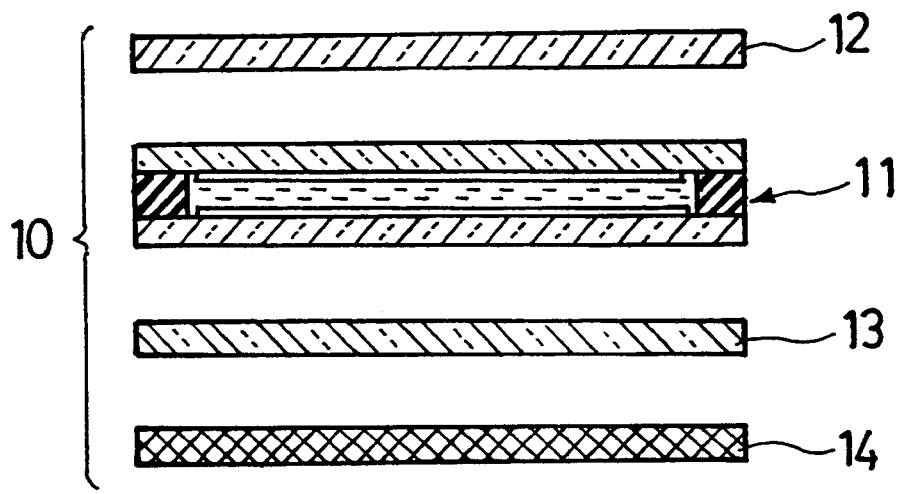
FIG. 1 is a schematic sectional view showing the construction of a first embodiment of a liquid crystal display device according to the invention.
Figure 2:
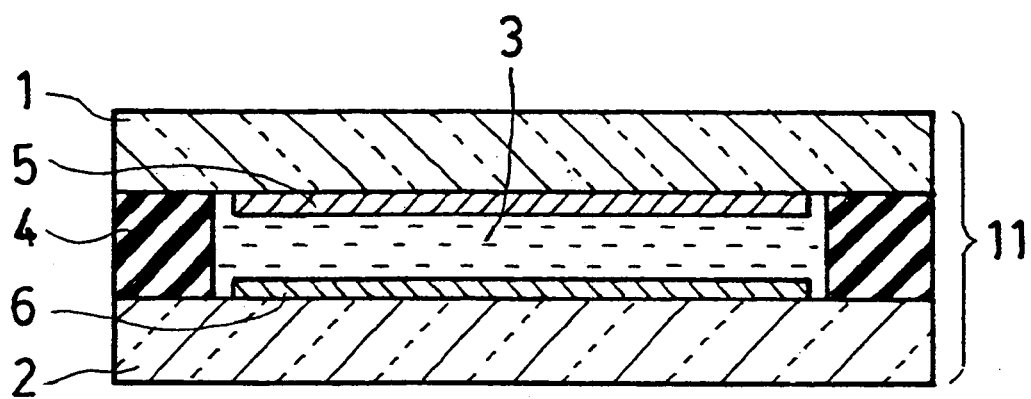
FIG. 2 is an enlarged sectional view showing the construction of a liquid crystal cell of the liquid crystal display device.

First Embodiment: FIGS. 1 and 2

First, a first embodiment of a liquid crystal display device according to the invention is described with reference to FIGS. 1 and 2.

FIG. 1 is a schematic sectional view for illustrating the construction of a liquid crystal display panel making up the liquid crystal display device, and the figure shows an enlarged view of a liquid crystal cell and respective polarizing films with respect to thicknesses thereof and respective spacings therebetween.

As shown in FIG. 1, the liquid crystal display panel 10 is made up of a liquid crystal cell 11, a first reflective polarizing film 12 disposed on the visible side (the upper side in the figure) of the liquid crystal cell 11, a second reflective polarizing film 13 disposed on the opposite side (the underside) of the liquid crystal cell 11, from the visible side, and a light absorption film 14 disposed under the second reflective polarizing film 13.

As shown in FIG. 2, the liquid crystal cell 11 comprises two glass substrates 1,2, and liquid crystals 3 sandwiched between the two glass substrates so as to be sealed in with sealing agents 4, and a twisted nematic (TN) liquid crystal compound having a twist angle of not more than 90 degrees is used for the liquid crystals 3.

Transparent electrodes 5, 6, made of indium tin oxide (ITO), are formed on the inner faces of the two glass substrates 1, and 2, respectively, on the side in contact with the liquid crystals 3, and an aligning treatment is further applied to the inner face of the respective transparent electrodes, in contact with the liquid crystals 3, such that liquid crystal molecules are aligned in a predetermined direction.

The alignment condition of the liquid crystals 3 held between the transparent electrodes 5, 6 is altered by applying a voltage between the transparent electrodes 5, 6, thereby indicating various information in digital display or graphic display.

The first reflective polarizing film 12 and the second reflective polarizing film 13, disposed above and below the liquid crystals cell 11, respectively, with the liquid crystal cell 11 interposed therebetween, are arranged so that the transmission axes thereof are parallel with each other.

Further, the first reflective polarizing film 12 is disposed such that the transmission axis thereof is oriented in the direction of (parallel with) the long axes of liquid crystal molecules located on the visible side of the liquid crystals cell 11.

Either of the first reflective polarizing film 12 or the second reflective polarizing film 13 is a polarizing sheet (reflective-type polarizing sheet) reflecting the light linearly polarized in the direction orthogonal to the transmission axis thereof. For example, an optical film, DBEF (trade name), manufactured by Minnesota Mining and Manufacturing Co., U.S.A., is used for such a reflective-type polarizing sheet. The same can be obtained from Sumitomo 3M Co., Ltd., in Japan.

The reflective-type polarizing sheet as described has been developed by the manufacturer described and disclosed in detail in JP (PCT) H9-507308A (International Publication No. WO95/17691) and JP (PCT) H9-511844A (International Publication No. WO95/27919).

With the liquid crystal display panel according to this embodiment of the invention, half of the light falling on the liquid crystal display panel 10 from above as in FIG. 1 is reflected by the first reflective polarizing film 12, and the other half thereof is transmitted therethrough. Since no voltage is applied to the liquid crystals 3 of the liquid crystal cell 11 in the background part of information display for displaying character information and graphic information, the transmitted half of light is rotated by 90 degrees when transmitted through the liquid crystal cell 11 and is turned to linearly polarized light having its oscillation plane orthogonal to the transmission axis of the second reflective polarizing film 13, thus being reflected by the second reflective polarizing film 13.

Consequently, substantially all the entire light falling on the background part of the information display is reflected, indicating display in a metallic color (like a mirror).

In the display segment of the liquid crystal cell 11 for displaying character information and graphic information, where a voltage has been applied, light transmitted through the first reflective polarizing film 12 is not rotated when transmitted through the liquid crystal cell 11, and is turned to the light linearly polarized in the direction parallel with the direction of the transmission axis of the second reflective polarizing film 13, thereby being allowed to pass through the second reflective polarizing film 13, to be absorbed by the light absorption film 14, thus indicating display in a black (dark) color.

By use of a material colored so as to reflect a light component at a specific wavelength only for the light absorption film 14, various information can be displayed in optional colors.

Thus, the liquid crystal display panel according to the invention is capable of effecting display in an optional color against the background in a metallic tone in marked contrast with the conventional liquid crystal display panel for indicating digital display of time information, calendar information, and so forth, and displaying various information in a black (dark) color against the white (gray) background, enabling variation in design to be provided so as to enhance novelty and aesthetic value.

Further, if the first reflective polarizing film 12 and the second reflective polarizing film 13, disposed above and below the liquid crystal cell 11, respectively, holding the liquid crystal cell 11 inbetween, are arranged such that the transmission axes of both the first reflective polarizing film and the second reflective polarizing film cross each other at right angles so as to conform to the twist angle of the liquid crystals 3, black and white can be inverted between the background part and the display segment, thereby displaying various information in a metallic color against the background in optional colors.

Furthermore, it is also possible to render transparent the display segment or the background part through which half of the light falling on the liquid crystal display panel is transmitted by dispensing with the light absorption film 14 shown in FIG. 1 so that the internal structure of electronic equipment provided with the liquid crystal display panel such as a timepiece, and so forth can be seen from outside.

Needless to say, the invention can be applied to not only a liquid crystal display device using a liquid crystal display panel for indicating digital display wherein electrodes 5,6 of the liquid crystal cell 11 are formed in a plurality of segment patterns such as the seven-segment pattern for displaying numbers, and so forth, but also to a liquid crystal display device using a liquid crystal display panel for displaying various characters and graphics wherein electrodes 5,6 of the liquid crystal cell 11 are formed in the dot matrix pattern.

A case where the liquid crystals sealed in the liquid crystal cell 11 are twisted nematic (TN) liquid crystals causing linearly polarized light passing therethrough to undergo phase modulation has been described in the foregoing by way of example. However, supertwisted nematic (STN) liquid crystals or guest host liquid crystals causing linearly polarized light passing therethrough to undergo intensity modulation may be used instead.

The guest host liquid crystal is a mixed-type liquid crystal produced by dissolving a dichromatic dye as solute in a liquid crystal compound as solvent. If the alignment condition of the guest host liquid crystal molecules is caused to change by applying an electric field thereto, alignment of the dichromatic dye can be controlled following movement of the guest host liquid crystal molecules, thereby indicating display after modulating absorption of light incoming from a given direction.

Accordingly, by putting the guest host liquid crystals to use as the liquid crystals 3 of the liquid crystal cell 11 in the liquid crystal display panel described above, it is easier to color the display segments against the background in a metallic color.

Second to Seventh Embodiments: FIGS. 3 to 8

Now, second to seventh embodiments of a liquid crystal display device according to the invention are described with reference to FIGS. 3 and 8.

Any of these figures is a schematic sectional view, similar to FIG. 1, showing various constructions of a liquid crystal display panel used in carrying out various embodiments of a liquid crystal display device according to the invention. In these figures, parts corresponding to those previously described with reference to FIG. 1 are denoted by the same reference numerals, and description thereof is omitted.

Figure 3:
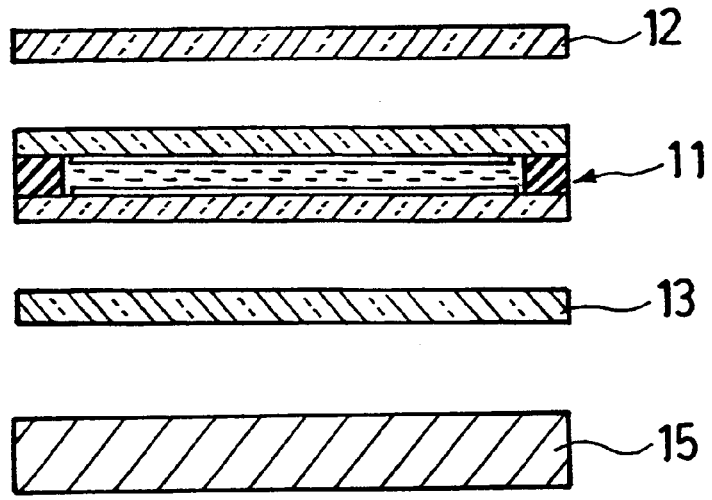
FIGS. 3 to 8 are schematic sectional views for illustrating the construction of second to seventh embodiments of a liquid crystal display device according to the invention, respectively.

FIG. 3 shows the construction of a liquid crystal display panel used in the liquid crystal display device according to the second embodiment of the invention.

As in the case of the liquid crystal display panel 10 shown in FIG. 1, this liquid crystal display panel is provided with a first reflective polarizing sheet 12 and a second reflective polarizing sheet 13, both being reflective-type polarizing sheets, disposed above and below a liquid crystal cell 11, respectively, with the liquid crystal cell 11 interposed therebetween, except that a backlight 15 is installed under the second polarizing sheet 13 in place of the light absorption film 14 in FIG. 1.

For the backlight 15, an electroluminescence (EL) element, a light-emitting diode (LED) element, a cold cathode tube, or a hot cathode tube is used.

The liquid crystal display panel according to this embodiment has the same display function, using external light, as that for the liquid crystal display panel 10 described in the foregoing. However, the light transmitting part thereof indicates display in the color of the surface of the backlight 15 instead of the color of the light absorption film 14.

By causing the backlight 15 to emit light when the external light being insufficient in quantity, the light emitted thereby outgoes toward the visible side (upward in FIG. 5) through a light transmitting part so that either of a display segment or background part is illuminated for display by the light emitted by the backlight 15.

Accordingly, display in various colors can be effected by use of substances emitting light in various colors such as red, green, yellow, and so forth, for the backlight 15, or by use of a substance emitting white light in combination with color filters.

Figure 4:
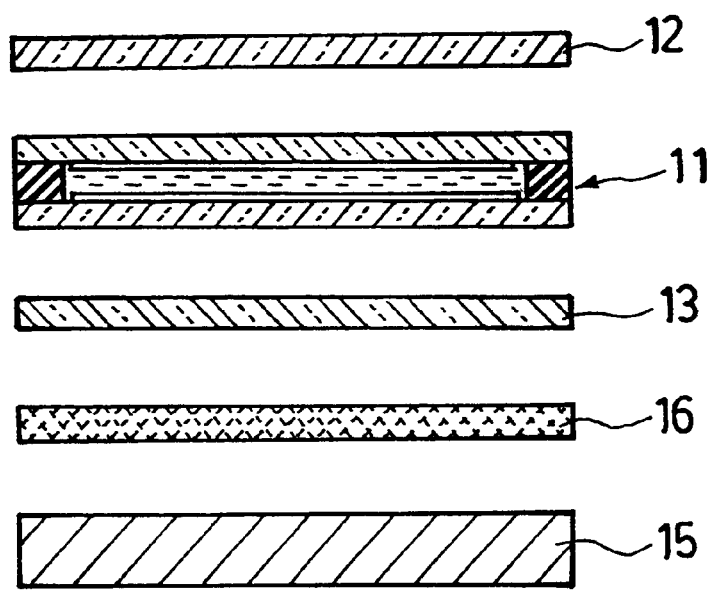

FIG. 4 shows the construction of a liquid crystal display panel used in the liquid crystal display device according to the third embodiment of the invention. This liquid crystal display panel is provided with a translucent absorbing film 16 disposed between the backlight 15 of the liquid crystal display panel shown in FIG. 3, and the second reflective polarizing sheet 13 adjacent thereto.

With such a construction, a viewer can see reflective-type display by external light in a scattered color due to the translucent absorbing film 16 with greater ease. Also, in the case of transmissive-type display using the backlight, light emitted by the backlight 15 is scattered and moderated when transmitted through the translucent absorbing film 16, thereby turning the display into one in a softer tone, which is easier for a viewer to see.

Figure 5:
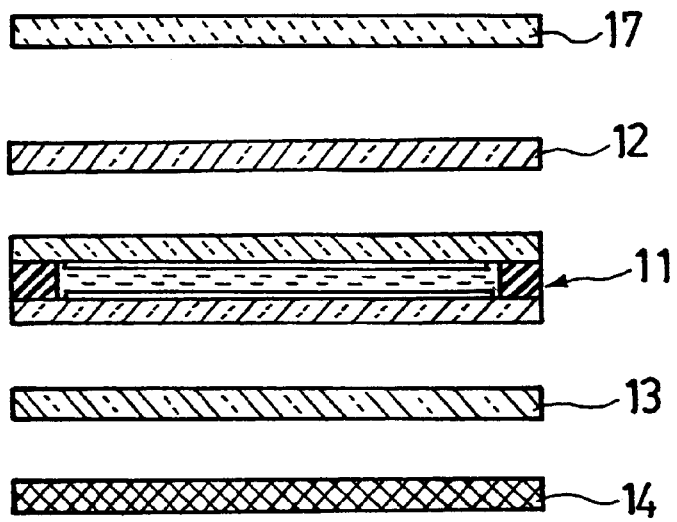

FIG. 5 shows the construction of a liquid crystal display panel used in the liquid crystal display device according to the fourth embodiment of the invention. This liquid crystal display panel is provided with an absorption-type polarizing film 17 disposed on the visible side of the first reflective polarizing sheet 12 of the liquid crystal display panel 10 shown in FIG. 1.

The absorption type polarizing film 17 is a common absorption-type polarizing film for absorbing the light linearly polarized in the direction orthogonal to the transmission axis thereof, and disposed such that the transmission axis thereof is oriented substantially in the same direction of the transmission axis of the first reflective polarizing sheet 12.

With this liquid crystal display panel, since half of the external light falling thereon is absorbed by the absorption type polarizing film 17, and the other half thereof falls on a first reflective polarizing sheet 12, as the light linearly polarized in the same direction as that of the transmission axis of the first polarizing sheet 12, most of the light is transmitted through the first polarizing sheet 12 without being reflected thereby, and then falls on the liquid crystal cell 11.

A portion of light, rotated through 90 degrees when transmitted through the liquid crystal cell 11 (the background), is reflected by the second reflective polarizing sheet 13, and sent out toward the visible side along the same optical path as before but in the reverse direction, thus indicating display in a metallic color, while the other portion of light, not rotated when transmitted through the liquid crystal cell 11 (the display segment), is transmitted through the second reflective polarizing sheet 13.

Since the light transmitted through the second reflective polarizing sheet 13 is mostly absorbed by the light absorption film 14 (layer or sheet), there will be no light reflected toward the visible side, thus displaying the display segment in a black or dark color.

The light absorption film 14, however, may be dispensed with, and in such a case, the display segment turns transparent so that the internal structure of an electronic equipment equipped with the liquid crystal display panel can be seen from outside, providing an interesting and amusing display. Otherwise, the light absorption film may be installed on the side of the electronic equipment. Otherwise, if a white film, a gray film, or a variously colored film (layer or sheet) is installed in place of the light absorption film, irregular reflection therefrom causes information to be displayed colorfully in a white, a gray, or an optional color, distinct from the metallic color in which the background is displayed.

With this embodiment, as little light is reflected from across the surface of the first reflective polarizing sheet 12, a somewhat darker display will be shown. However, metallic gloss (luster) across the surface of a display will be moderated, enabling a viewer to see the display with greater ease, and also improving the viewing angle characteristic of the liquid crystal display panel.

If a color polarizing film capable of mainly absorbing a light component at a specific wavelength, out of the light linearly polarized in the direction orthogonal to the transmission axis thereof, is used as the absorption type polarizing film 17, the metallic gloss (luster) across the surface of the display can be moderated without sacrificing much brightness of display, enabling a viewer to see the display with greater ease, and also improving the viewing angle characteristic of the liquid crystal display panel.

Figure 6:
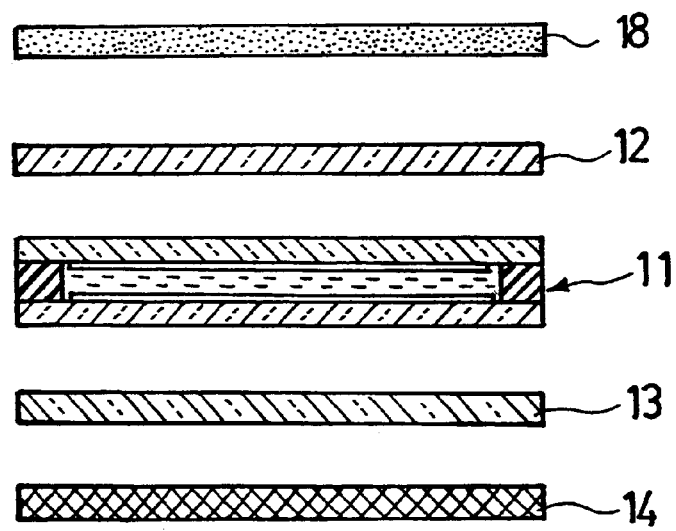

FIG. 6 shows the construction of a liquid crystal display panel used in the liquid crystal display device according to the fifth embodiment of the invention. This liquid crystal display panel is provided with a light diffusion film 18 serving as a light diffusion (dispersion) layer installed on the visible side of the first reflective polarizing sheet 12 of the liquid crystal display panel shown in FIG. 5 in place of the absorption-type polarizing film 17.

The light diffusion film 18 is formed by applying a binder with silica particles consisting of silicon oxide, acrylic beads, or calcium powders mixed therein to a transparent filmy substrate. On the other hand, the light diffusion film 18 can be formed by applying embossing to the surface of a transparent base film. Otherwise, the light diffusion layer may be formed by sticking directly such a film described as above to the upper surface of the first reflective polarizing sheet 12, or by coating same with a light diffusion agent.

With such a construction as described above, since light reflected from across the surface of the first reflective polarizing sheet 12 and light reflected from a second reflective polarizing sheet 13 acting like a mirror are diffused, the metallic gloss can be moderated, effecting display in softer and more elegant tones while improving the viewing angle characteristic of the liquid crystal display panel as well. However, contrast between brightness and darkness in display is somewhat deteriorates in this case. Otherwise, the liquid crystal display panel according to this embodiment has the same display functions as those of the liquid crystal display panel shown in FIG. 5.

As with the case of the fourth embodiment described hereinbefore, with the liquid crystal display panel according to this embodiment, too, the light absorption film 14 may be dispensed with, or installed on the side of the electronic equipment. Otherwise, a white film, a gray film, or a variously colored film (layer or sheet) may be installed in place of the light absorption film.

Figure 7:
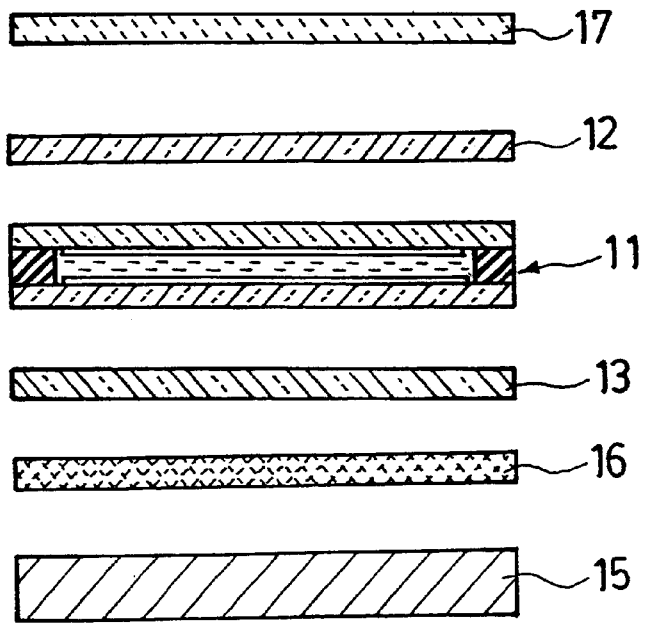

FIG. 7 shows the construction of a liquid crystal display panel used in the liquid crystal display device according to the sixth embodiment of the invention. The liquid crystal display according to this embodiment is provided with a translucent absorbing film 16 and a backlight 15, disposed on the opposite side (the underside in the figure) of a second reflective polarizing sheet 13, from the visible side, in place of the light absorption film 14 of the liquid crystal display panel shown in FIG. 6. The translucent absorbing film 16 and the backlight 15 are the same as those described in the third embodiment with reference to FIG. 4.

With such a construction as described above, reflective display by external light as well as transmissive display by light emitted from the backlight 15 can be effected such that a viewer can see the display with ease.

Further, the translucent absorbing film 16 disposed between the backlight 15 and the second reflective polarizing sheet 13 may be dispensed with.

Figure 8:
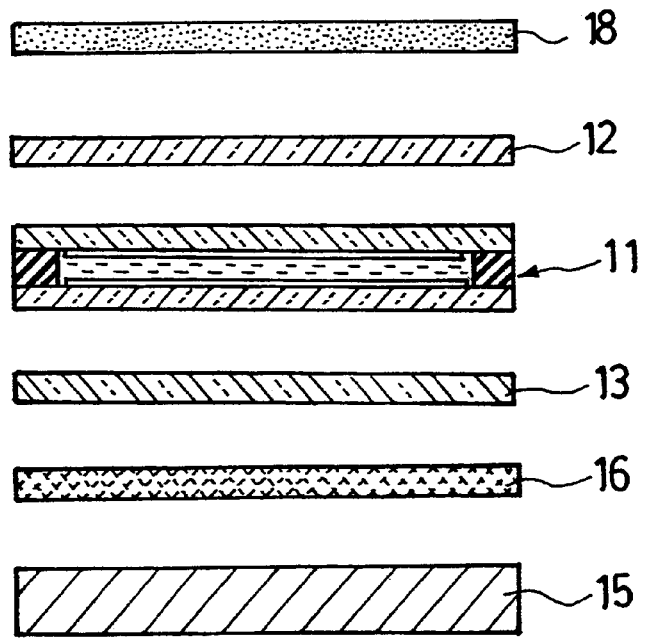

FIG. 8 shows the construction of a liquid crystal display panel used in the liquid crystal display device according to the seventh embodiment of the invention. The liquid crystal display panel according to this embodiment is provided with a translucent absorbing film 16 and a backlight 15, disposed on the opposite side (the underside in the figure) of a second reflective polarizing sheet 13, from the visible side, in place of the light absorption film 14 of the liquid crystal display panel shown in FIG. 6 in the same way as with the case of the liquid crystal display panel shown in FIG. 7. This liquid crystal display panel has the same display functions as those of the liquid crystal display panel shown in FIG. 7.

In this case too, the translucent absorbing film 16 disposed between the backlight 15 and the second reflective polarizing sheet 13 may be dispensed with.

In any of the embodiments described in the foregoing, various modifications described in the first embodiment can be applied for the same effects.

Application Example of the Liquid Crystal Display Device of the Invention

Now a digital quartz watch wherein the liquid crystal display device according to the invention is used will be described hereinafter by way of example.

Figure 9:
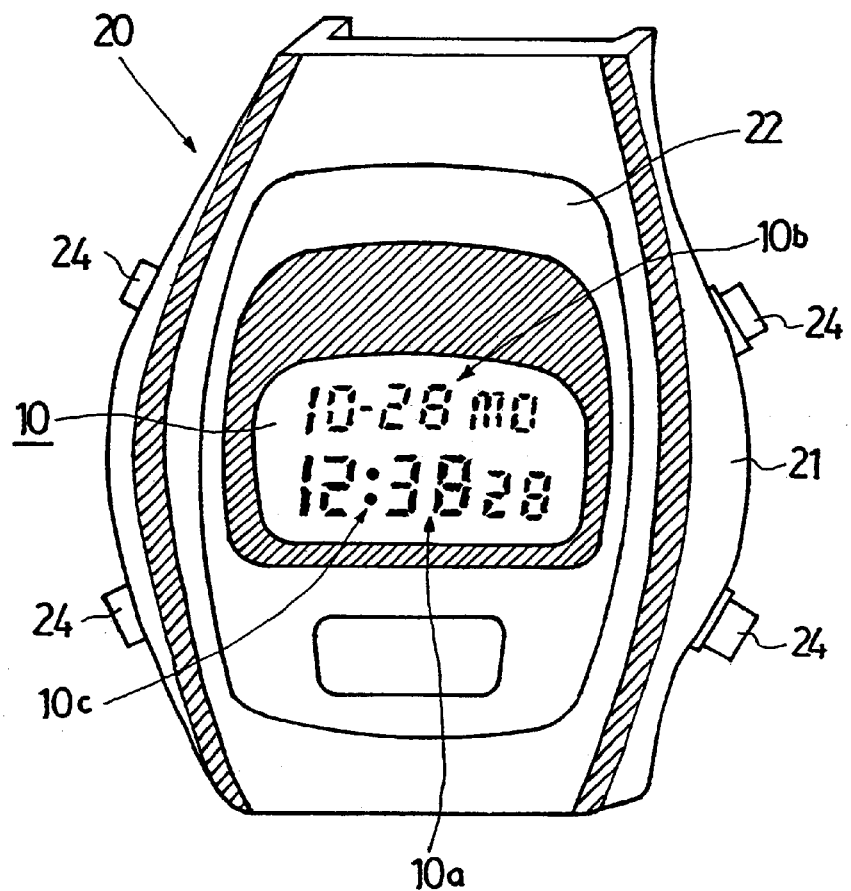
FIG. 9 is a perspective view showing the external view of a quartz watch for illustrating an application example of the liquid crystal display device according to the invention.
Figure 10:
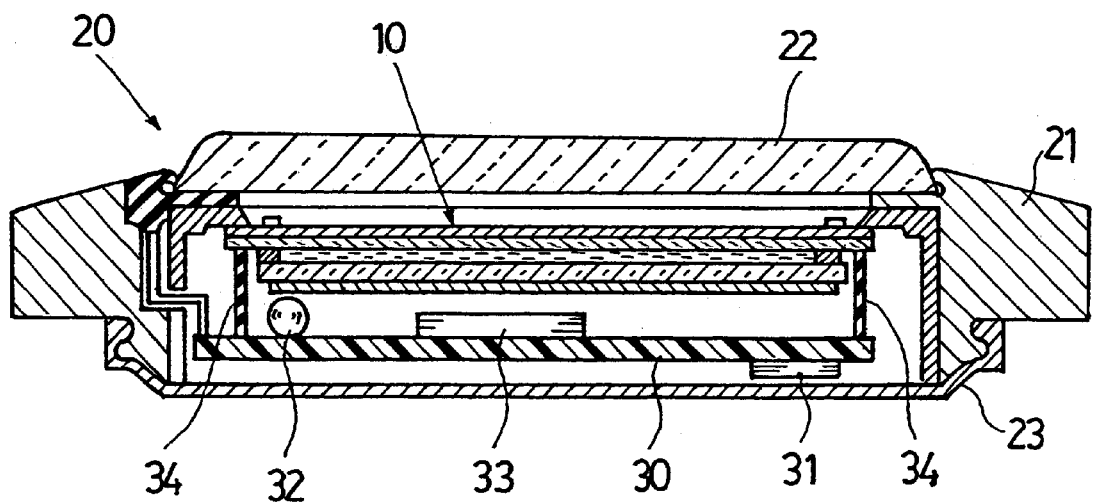
FIG. 10 is a sectional view showing the internal construction of the quartz watch.

FIG. 9 is a perspective view of the watch showing the external view thereof and FIG. 10 is a sectional view showing the internal structure thereof.

A case 20 of the quartz watch comprises of a glass 22 and a case back 23, integrally joined with a case body 21 made of metal.

The glass 22 is made of a transparent material such as sapphire glass, tempered glass, or plastic, and is integrally joined with the front face of the case body 21 by means of direct bonding, or fitting therein using packing. The case back 23 is integrally joined with the back face of the case body 21 by means of screws or fittings using packing.

Thus, the case 20 has an airtight inner structure so as not to allow ingress of dust or moisture.

A liquid crystal display panel (liquid crystal display device) 10 to serve as a display for indicating time and so forth is installed on the side of the glass 22 inside the case 20.

The liquid crystal display panel 10 comprises a time display section 10a for displaying the hour, minute, and second, a calendar display section 10b for displaying month, day, days of the week, and a colon mark display section 10c that blinks every second, for example.

Further, the liquid crystal display panel 10 is capable of displaying functions including time display for 12 consecutive hours or 24 consecutive hours as usual, an alarm function, a stopwatch function, a timer function, and so forth.

Changeover among such various functions, and correction of time, is executed by manipulating a plurality of switching buttons 24 installed in the side of the case body 21 of the case 20. Packing is provided between each of the switching buttons 24 and the case body 21 so as not to allow ingress of dust and moisture into the case 20.

As shown in FIG. 2, the quartz watch has an inner structure such that the liquid crystal display panel 10 and a printed circuit board 30 are disposed substantially parallel with each other inside the case 20, and a battery 31 serving as a driving power source of the printed circuit board 30 is installed on the case back 23 side of the printed circuit board 30.

A semiconductor integrated circuit 33 comprising a crystal oscillator 32 having an oscillation frequency of 32,768 Hz, a crystal oscillation circuit for generating a predetermined signal by oscillating the crystal oscillator, a counting-down circuit, a driving circuit for driving the liquid crystal display panel 10, a central processing unit (CPU) for overall control of the quartz watch, and so forth, is mounted on the printed circuit board 30.

The liquid crystal display panel 10 is electrically connected with the printed circuit board 30 via a zebra-rubber connector 34 disposed therebetween. The zebra-rubber connector 34 is disposed so as to be compressed thicknesswise in order to ensure electrical connection between the liquid crystal display panel 10 and the printed circuit board 30.

The zebra-rubber connector 34 is made up of electrically conductive layers, composed of insulating silicone rubber with carbon and metal particles contained therein, and formed at a predetermined pitch, and electrically conductive in the direction of thickness thereof via the respective electrically conductive layers, but is in a transversely insulated condition between adjacent electrically conductive layers.

A connection terminal pattern is formed on the faces of the liquid crystal display panel 10 and the printed circuit board 30, opposite to each other, respectively, in such a fashion as to correspond to vertically conductive parts of the zebra-rubber connector 34, formed of the electrically conductive layer, respectively, and insulation parts of the zebra-rubber connector 34, alternately disposed, and in dimensions at the same pitch as that for the vertically conductive parts.

With the watch, external light falling on the reflective-type liquid crystal display panel 10 from the side of the glass 22 (the visible side) can indicate digital display of time information such as the hour, minute, and second, and calendar information such as date, days of the week, month, and year in various states (in a dark color, white color, various other colors, or in such a state as to allow the internal structure of the watch to be visible from outside) against the background shown in a metallic tone.

Conversely, the display condition can be inverted between the background part and the display segment of the liquid crystal display panel 10 so that time information, calendar information, and so forth can be displayed in a metallic tone.

Any of the liquid crystal display panels described hereinbefore in the first to the seventh embodiments may be used as the liquid crystal display panel 10.

In the case where the watch is equipped with the liquid crystal display panel provided with the backlight 15, however, transmissive display can be indicated only when the backlight is lit up by pressing any of the switching buttons 24.

Industrial Applicability

As described in the foregoing, with the liquid crystal display device according to the invention, various information can be displayed in various states such as in a dark color, white color, various other colors, or in such a state as to allow the internal structure of an electronic equipment to be visible from outside against the background like a mirror or in a softened metallic tone when external light falls thereon. With the liquid crystal display device provided with the backlight, transmissive display can be indicated in dark locations.

Further, by inverting display conditions between the background part and the information display segment of the liquid crystal display panel, characters, numbers, graphics, or so forth for representing various information can be displayed in a metallic tone.

Accordingly, the liquid crystal display device according to the invention can be used as a display panel incorporated in various electronic equipment such as a digital quartz timepiece, other portable electronic equipment, and so forth, thereby enabling novel and amusing electronic equipment adaptable to variation in design to be provided.

What is claimed is:

1. A liquid crystal display device displaying in a metallic tone on an information displaying segment or on a background part, comprising:

an information displaying liquid crystal cell, with liquid crystals sealed thereinbetween, sandwiched between two transparent substrates having an electrode on each of inner surfaces thereof facing each other;

a first reflective polarizing film disposed on a visible side of the liquid crystal cell;

a second reflective polarizing film disposed on a side of the liquid crystal cell, opposite from the visible side thereof; and a light absorption film disposed on a side of the second reflective polarizing film, opposite from the liquid crystal cell;

said first reflective polarizing film as well as said second reflective polarizing film is a polarizing sheet reflecting light linearly polarized in a direction orthogonal to the transmission axis thereof.

2. A liquid crystal display device according to claim 1, wherein the first reflective polarizing film and the second reflective polarizing film are disposed such that the transmission axes thereof cross each other at right angles.

3. A liquid crystal display device according to claim 1, wherein the first reflective polarizing film and the second reflective polarizing film are disposed such that the transmission axes thereof run in parallel with each other.

4. A liquid crystal display device according to claim 1, wherein liquid crystals causing linearly polarized light passing therethrough to undergo phase modulation or intensity modulation are sealed in the liquid crystal cell.

5. A liquid crystal display device according to claim 4, wherein the liquid crystals are twisted nematic liquid crystals.

6. A liquid crystal display device according to claim 4, wherein the liquid crystals are supertwisted nematic liquid crystals.

7. A liquid crystal display device according to claim 4, wherein the liquid crystals are guest host liquid crystals.

8. A liquid crystal display device according to claim 1, wherein the first reflective polarizing film is disposed such that the transmission axis thereof is oriented in direction parallel with or orthogonal to the long axes of liquid crystal molecules located on the visible side of the liquid crystal cell.

9. A liquid crystal display device displaying in a metallic tone on an information displaying segment or on a background part, comprising:

an information displaying liquid crystal cell with liquid crystals sealed thereinbetween, sandwiched between two transparent substrates having an electrode on each of inner surfaces thereof facing each other;

a first reflective polarizing film disposed on a visible side of the liquid crystal cell;

a second reflective polarizing film disposed on the side of the liquid crystal cell, opposite from the visible side thereof;

a backlight disposed on a side of the second reflective polarizing film, opposite from the liquid crystal cell; and a translucent absorbing film installed between the backlight and the second reflective polarizing film;

said first reflective polarizing film as well as said second reflective polarizing film is a polarizing sheet reflecting light linearly polarized in a direction orthogonal to the transmission axis thereof.

10. A liquid crystal display device displaying in a metallic tone on an information display segment or on a background part, comprising:

an information displaying liquid crystal cell with liquid crystals sealed thereinbetween, sandwiched between two transparent substrates having an electrode on each of inner surfaces thereof facing each other;

a first reflective polarizing film disposed on a visible side of the liquid crystal cell;

a second reflective polarizing film disposed on a side of the liquid crystal cell, opposite from the visible side thereof; and an absorption-type polarizing film disposed on a visible side of the first reflective polarizing film;

said first reflective polarizing film as well as said second reflective polarizing film is a polarizing sheet reflecting light linearly polarized in a direction orthogonal to the transmission axis thereof;

said absorption-type polarizing film is a color polarizing film mainly absorbing a light component at a specific wavelength, out of the linearly polarized in a direction orthogonal to the transmission axis thereof; and said transmission axis of the absorption-type polarizing film is oriented substantially in a direction of said transmission axis of the first reflective polarizing film.

11. A liquid crystal display device according to claim 10, wherein a light absorption film is disposed on the side of the second reflective polarizing film, opposite from the liquid crystal cell.

12. A liquid crystal display device according to claim 10, wherein a backlight is disposed on the side of the second reflective polarizing film, opposite from the liquid crystal cell.

13. A liquid crystal display device according to claim 12, wherein a translucent absorbing film is installed between the backlight and the second reflective polarizing film.

14. A liquid crystal display device displaying in a metallic tone on an information display segment or on a background part, comprising:

an information displaying liquid crystal cell with liquid crystals sealed thereinbetween, sandwiched between two transparent substrates having an electrode on each of inner surfaces thereof facing each other;

a first reflective polarizing film disposed on a visible side of the liquid crystal cell;

a second reflective polarizing film disposed on a side of the liquid crystal cell, opposite from the visible side thereof; and a light diffusion layer disposed on a visible side of the first reflective polarizing film;

said first reflective polarizing film as well as said second reflective polarizing film is a polarizing sheet reflecting light linearly polarized in a direction orthogonal to the transmission axis thereof.

15. A liquid crystal display device according to claim 14, wherein a light absorption film is disposed on the side of the second reflective polarizing film, opposite from the liquid crystal cell.

16. A liquid crystal display device according to claim 14, wherein a backlight is disposed on the side of the second reflective polarizing film, opposite from the liquid crystal cell.

17. A liquid crystal display device according to claim 16, wherein a translucent absorbing film is installed between the backlight and the second reflective polarizing film.

* * * * *